US008554645B1

(12) United States Patent
Hwu et al.

(10) Patent No.: US 8,554,645 B1
(45) Date of Patent: Oct. 8, 2013

(54) METHOD AND SYSTEM FOR IDENTIFYING BUSINESS EXPENDITURES WITH VENDORS AND AUTOMATICALLY GENERATING AND SUBMITTING REQUIRED FORMS

(75) Inventors: Michael Hwu, San Diego, CA (US); Bennett R. Blank, San Diego, CA (US); Abraham Zafar, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 329 days.

(21) Appl. No.: 12/984,137

(22) Filed: Jan. 4, 2011

(51) Int. Cl.
   *G07B 17/00* (2006.01)
   *G07F 19/00* (2006.01)
   *G06Q 10/00* (2012.01)
   *G06Q 50/00* (2012.01)
   *G06F 17/22* (2006.01)

(52) U.S. Cl.
   USPC .................................. 705/30; 705/2; 705/31

(58) Field of Classification Search
   USPC .................................. 705/30, 2, 31
   See application file for complete search history.

(56) References Cited

U.S. PATENT DOCUMENTS

| | | | | |
|---|---|---|---|---|
| 5,563,999 A * | 10/1996 | Yaksich et al. | ................ | 715/209 |
| 6,115,690 A * | 9/2000 | Wong | ........................... | 705/7.27 |
| 6,199,079 B1 * | 3/2001 | Gupta et al. | ................... | 715/207 |
| 6,327,594 B1 * | 12/2001 | Van Huben et al. | ................... | 1/1 |
| 6,356,909 B1 * | 3/2002 | Spencer | ........................... | 1/1 |
| 6,411,940 B1 * | 6/2002 | Egendorf | ....................... | 705/40 |
| 7,398,234 B1 * | 7/2008 | Theis et al. | ...................... | 705/30 |
| 7,753,258 B1 * | 7/2010 | Quinn et al. | ................... | 235/379 |
| 7,805,343 B1 * | 9/2010 | Lyons et al. | .................... | 705/31 |
| 7,840,890 B2 * | 11/2010 | Lund | ............................ | 715/222 |
| 7,912,735 B1 * | 3/2011 | Akin et al. | ....................... | 705/2 |
| 7,971,139 B2 * | 6/2011 | Stanciu et al. | ................ | 715/237 |
| 8,019,664 B1 * | 9/2011 | Tifford et al. | ................... | 705/31 |
| 8,032,592 B2 * | 10/2011 | Campise et al. | .............. | 709/206 |
| 8,095,439 B1 * | 1/2012 | Harman et al. | .................. | 705/30 |
| 8,165,997 B1 * | 4/2012 | Podgorny et al. | ............ | 707/688 |
| 8,260,635 B2 * | 9/2012 | Hasan et al. | ...................... | 705/2 |
| 8,260,805 B1 * | 9/2012 | Venu et al. | .................... | 707/769 |
| 8,271,344 B1 * | 9/2012 | Channakeshava et al. | .. | 705/26.1 |
| 8,326,710 B2 * | 12/2012 | Ernst | .............................. | 705/31 |
| 8,359,210 B1 * | 1/2013 | Altinger et al. | .................. | 705/4 |
| 8,392,208 B1 * | 3/2013 | Klieman et al. | ................. | 705/2 |
| 8,396,796 B1 * | 3/2013 | Vu et al. | ......................... | 705/40 |

(Continued)

OTHER PUBLICATIONS

Avoiding fraud risks with EHRS, Helton Jeffory, Healthcare Financial managenment 64.7 Jul. 2010: 76-81.*

*Primary Examiner* — Matthew Gart
*Assistant Examiner* — Harshad Parikh
(74) *Attorney, Agent, or Firm* — McKay and Hodgson, LLP; Philip McKay; Sean P. Lewis

(57) ABSTRACT

A method and system for determining business expenditures with vendors and automatically generating and submitting required forms whereby vendor identification data and/or contact information is obtained. Data representing current vendor reporting requirements and/or contact information for any associated reporting agency is obtained and stored along with data representing one or more associated reporting forms. Financial transaction data associated with a business is then obtained and analyzed using the current vendor reporting requirement data to identify/match one or more vendors used by the business that are subject to the reporting requirement. At least part of the identification data associated with subject vendors, and at least part of the financial transaction data associated with the business, is used to auto-fill one or more forms associated with the reporting requirement for each of the identified subject vendors and the auto-filled forms are then sent to the respective vendors, and/or the appropriate reporting agency automatically.

12 Claims, 2 Drawing Sheets

(56) References Cited

U.S. PATENT DOCUMENTS

| | | | |
|---|---|---|---|
| 8,417,596 B1* | 4/2013 | Dunbar et al. | 705/31 |
| 8,429,038 B1* | 4/2013 | Harman et al. | 705/30 |
| 2003/0083903 A1* | 5/2003 | Myers | 705/2 |
| 2004/0078271 A1* | 4/2004 | Morano et al. | 705/19 |
| 2004/0254816 A1* | 12/2004 | Myers | 705/2 |
| 2004/0254927 A1* | 12/2004 | Lang et al. | 707/5 |
| 2005/0055290 A1* | 3/2005 | Bross et al. | 705/31 |
| 2005/0065852 A1* | 3/2005 | Bross et al. | 705/19 |
| 2006/0020530 A1* | 1/2006 | Hsu et al. | 705/35 |
| 2006/0089869 A1* | 4/2006 | Mundy | 705/11 |
| 2006/0149566 A1* | 7/2006 | Lin | 705/1 |
| 2006/0235715 A1* | 10/2006 | Abrams et al. | 705/1 |
| 2007/0214162 A1* | 9/2007 | Rice | 707/101 |
| 2008/0065455 A1* | 3/2008 | Sun et al. | 705/8 |
| 2008/0212845 A1* | 9/2008 | Lund | 382/112 |
| 2008/0256128 A1* | 10/2008 | Pierce et al. | 707/104.1 |
| 2009/0048927 A1* | 2/2009 | Gross | 705/14 |
| 2009/0106115 A1* | 4/2009 | James et al. | 705/14 |
| 2009/0182602 A1* | 7/2009 | Black et al. | 705/7 |
| 2009/0198669 A1* | 8/2009 | Shaw et al. | 707/5 |
| 2010/0036760 A1* | 2/2010 | Abeles et al. | 705/31 |
| 2010/0144259 A1* | 6/2010 | Allexon et al. | 453/58 |
| 2010/0211416 A1* | 8/2010 | Frank et al. | 705/4 |
| 2010/0299168 A1* | 11/2010 | Alonzo et al. | 705/7 |
| 2010/0306032 A1* | 12/2010 | Jolley | 705/10 |
| 2011/0082797 A1* | 4/2011 | Glachant et al. | 705/67 |
| 2011/0282909 A1* | 11/2011 | Hicks | 707/784 |
| 2011/0288879 A1* | 11/2011 | Gice et al. | 705/2 |
| 2011/0301982 A1* | 12/2011 | Green et al. | 705/3 |
| 2012/0011515 A1* | 1/2012 | Jolfaei et al. | 718/103 |
| 2012/0089493 A1* | 4/2012 | Podgurny et al. | 705/32 |
| 2012/0109792 A1* | 5/2012 | Eftekhari et al. | 705/31 |
| 2012/0123915 A1* | 5/2012 | Risnoveanu et al. | 705/30 |
| 2012/0191580 A1* | 7/2012 | Bhatt | 705/30 |
| 2012/0203677 A1* | 8/2012 | Raleigh | 705/30 |
| 2012/0215669 A1* | 8/2012 | Lieberman et al. | 705/31 |
| 2012/0215670 A1* | 8/2012 | Pinkerman | 705/31 |
| 2012/0232935 A1* | 9/2012 | Voccola | 705/4 |
| 2012/0239530 A1* | 9/2012 | Varadarajan et al. | 705/26.41 |
| 2012/0330799 A1* | 12/2012 | Fox | 705/30 |
| 2013/0030962 A1* | 1/2013 | Erle et al. | 705/30 |
| 2013/0085903 A1* | 4/2013 | Cottingham et al. | 705/30 |
| 2013/0103553 A1* | 4/2013 | McGill | 705/30 |
| 2013/0132106 A1* | 5/2013 | Perry | 705/2 |

* cited by examiner

METHOD AND SYSTEM FOR IDENTIFYING BUSINESS EXPENDITURES WITH VENDORS AND AUTOMATICALLY GENERATING AND SUBMITTING REQUIRED FORMS

BACKGROUND

As data processing and storage capabilities have improved, various local, state, and/or Federal agencies and bureaucracies, i.e., governments, have come to rely on these capabilities to more effectively and efficiently gather, store, and use, various forms of data. As a result, these governmental powers have also imposed greater reporting and tracking responsibilities on their citizens, including small business owners and other taxpayers. Consequently, many small business owners are now faced, or soon will be faced, with the responsibility of providing the government more and more data by filling out and/or submitting more and more reports, schedules, forms, filings, etc. In addition, some of these forms, such as IRS form 1099, must be completed by the small business owner and then sent to third party vendors associated with the small business.

In many cases, the generation of this data, and the filling out of the associated forms, represents a significant burden on the small business owner and can result in significant fines, or other undesirable actions, if the forms are not completed properly and properly submitted.

One current example of the expanded data the Federal government, i.e., the Internal Revenue Service (IRS), may require starting in 2012 is the 1099 reporting requirement mandated by the recently passed Health Care and Education Reconciliation Act of 2010 (Pub.L. 111-152, 124 Stat. 1029), also referred to herein as the Healthcare Act. Under the Healthcare Act, any small business that spends in excess of $600.00 with any vendor in a given tax year must fill out an IRS form 1099 for that subject vendor and then submit the filled out 1099 form to the vendor. Of course, the small business owner will also want to maintain proof that this action was taken as well.

For many businesses, this new/expanded requirement of: tracking business expenditures with all vendors; identifying the subject vendors with which the business spent $600.00 or more in a given tax year; obtaining the proper identification and contact information for each subject vendor, such as the subject vendor's EIN/SSN number; gathering the expenditure data associated with all the subject vendors; obtaining the 1099 forms required; using the expenditure data to fill out the required 1099 form for each subject vendor; submitting the required 1099 form to the each subject vendor and/or the proper agency; and then creating and retaining proof of these actions for each subject vendor represents a significant investment of the business owner's time and/or resources. This, in turn, leaves less time and/or resources for the small business owner to devote to making his business succeed. Ironically, in the case of tax forms, such as IRS form 1099, the diversion of resources away from the management of the business can actually result in a less efficient/profitable business and therefore less tax revenue. Clearly this is less than ideal for both the business and the country.

In case of fact, the 1099 reporting mechanism enacted in the Health Care and Education Reconciliation Act of 2010 (Pub.L. 111-152, 124 Stat. 1029) is recognized as being so burdensome on small businesses that that particular provision has been singled out by the President and Congress as being subject to review and possible revision. However, as of the time of filling, the provision remains intact and is scheduled to take effect in 2012.

Regardless of whether the specific 1099 reporting mechanism enacted in the Health Care and Education Reconciliation Act of 2010 (Pub.L. 111-152, 124 Stat. 1029) is implemented or not, the fact remains that small business owners currently are, or likely will be, faced with the burden, or increased burden of: tracking expenditures with all vendors; identifying subject vendors with which the business spends some threshold amount, or more; obtaining the proper identification and contact information for each subject vendor, such as the subject vendor's EIN/SSN number; gathering the expenditure data associated with all the subject vendors; obtaining the appropriate one or more forms required; using the expenditure data to fill out one or more required forms, for each subject vendor; submitting the required forms to the each subject vendor and/or the proper agency; and then creating and retaining proof of these actions for each subject vendor.

As noted above, using current data processing and reporting systems this is, or will be, a significant burden on small business owners and has the potential to be a drain, or at least an addition strain, on the entire economy. However, as also noted above, despite these issues, increased reporting and an increased number of required forms will probably be an unavoidable fact for small business in the near future.

SUMMARY

In accordance with one embodiment, a method and system for determining business expenditures with vendors and automatically generating and submitting required forms includes a process for determining business expenditures with vendors and automatically generating and submitting required forms whereby, in one embodiment, a vendor information database mapping one or more vendors to their associated identification data and/or contact information is created and/or made accessible by the method and system for determining business expenditures with vendors and automatically generating and submitting required forms. In one embodiment, data representing current vendor reporting requirements for a specific jurisdiction and/or agency and/or contact information for any associated reporting agency is obtained and stored. In one embodiment, data representing one or more forms associated with the reporting requirements for the specific jurisdiction and/or agency is obtained and stored. In one embodiment, financial transaction data associated with a business is obtained from one or more sources. In one embodiment, the financial transaction data associated with the business is analyzed using at least part of the current vendor reporting requirement data to identify/match one or more vendors used by the business that are subject to the reporting requirement and therefore require the preparation and submission of one or more of the one or more forms associated with the reporting requirement. In one embodiment, at least part of the identification data associated with subject vendors, and at least part of the financial transaction data associated with the business, is used to auto-fill at least part of the one or more forms associated with the reporting requirement for each of the identified subject vendors. In one embodiment, the auto-filled forms associated with the reporting requirement for each of the identified subject vendors is then sent to the respective vendors, and/or the appropriate reporting agency, using the identification data associated with subject vendors and the data representing current vendor reporting requirements. In one embodiment, a copy of the submitted forms is also retained for access by the business owner.

Using the method and system for determining business expenditures with vendors and automatically generating and submitting required forms, as discussed herein, the expenditures made by a business with its vendors is tracked automatically by analyzing already existing financial transaction data associated with the business and then vendors subject to a reporting requirement are automatically identified and correlated with their vendor identification data, and any reporting agency contact data. Then, using the method and system for determining business expenditures with vendors and automatically generating and submitting required forms, as discussed herein, the already existing financial transaction data associated with the business, and the vendor identification data and any reporting agency contact data, is used to automatically, or semi-automatically, fill out the required forms, submit them to the subject vendors and/or reporting agencies, and a copy of the submitted forms is automatically saved for further use/evidence.

Consequently, using the method and system for determining business expenditures with vendors and automatically generating and submitting required forms, as discussed herein, the business owner is spared the considerable burden and use of resources currently required for: tracking expenditures with all vendors; identifying subject vendors with which the business spends some threshold amount, or more; obtaining the proper identification and contact information for each subject vendor, such as the subject vendor's EIN/SSN number; gathering the expenditure data associated with all the subject vendors; obtaining the appropriate one or more forms required; using the expenditure data to fill out one or more required forms, for each subject vendor; submitting the required forms to the each subject vendor and/or the proper agency; and then creating and retaining proof of these actions for each subject vendor.

As a result, using the method and system for determining business expenditures with vendors and automatically generating and submitting required forms, as discussed herein, a business owner can devote these saved resources to creating a more efficient and profitable business, thereby benefitting both the business and the economy as a whole.

As discussed in more detail below, using the below embodiments, with little or no modification and/or consumer input, there is considerable flexibility, adaptability, and opportunity for customization to meet the specific needs of various consumers under numerous circumstances.

Figure 1:
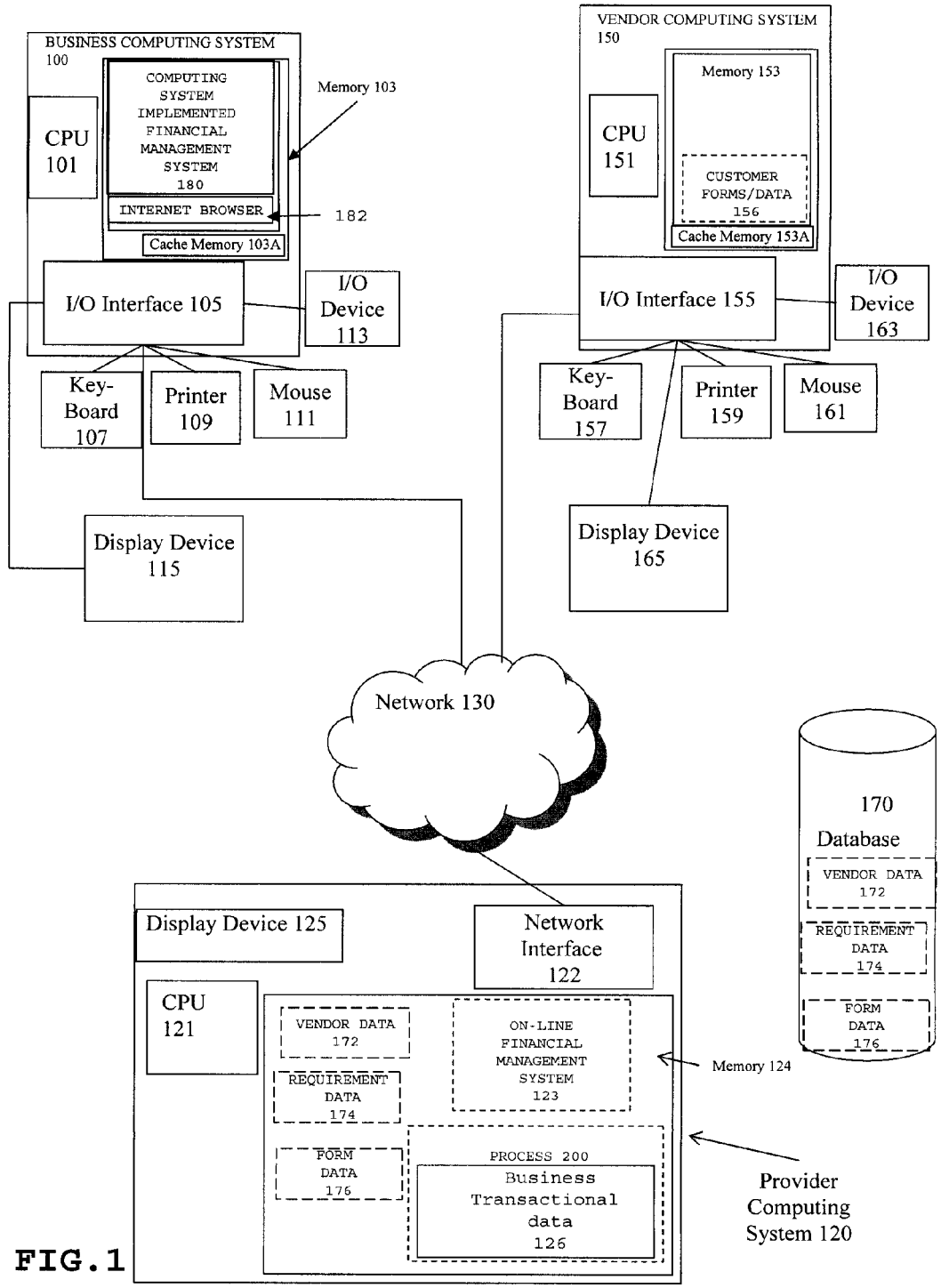
FIG. 1 is a block diagram of an exemplary hardware architecture for implementing one embodiment.

Common reference numerals are used throughout the FIG. s and the detailed description to indicate like elements. One skilled in the art will readily recognize that the above FIG. s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG. s, which depict one or more exemplary embodiments. Embodiments may be embodied in many different forms and should not be construed as limited to the embodiments set forth herein, shown in the FIG. s, and/or described below. Rather, these exemplary embodiments are provided to allow a complete disclosure that conveys the principles of the invention, as set forth in the claims, to those of skill in the art.

In accordance with one embodiment, a method and system for determining business expenditures with vendors and automatically generating and submitting required forms includes a process for determining business expenditures with vendors and automatically generating and submitting required forms whereby, in one embodiment, a vendor information database mapping one or more vendors to their associated identification data such as employer identification numbers (EIN), business tax identification number, Social Security Number (SSN), and/or contact information, such as mailing address, e-mail address, etc. is created and/or made accessible by the method and system for determining business expenditures with vendors and automatically generating and submitting required forms.

In various embodiments, the vendor information database and/or vendor identification data is obtained from one or more financial management systems.

As a specific example, in various embodiments the vendor information database and/or vendor identification data is obtained from any financial management system that, includes, is accessed by, and/or is otherwise associated with the process for determining business expenditures with vendors and automatically generating and submitting required forms.

Types of financial management systems currently available include, but are not limited to any of the following: an on-line, or web-based, or computing system implemented personal or business financial management system, package, program, module, or application; an on-line, or web-based, or computing system implemented home or business inventory system, package, program, module, or application; an on-line, or web-based, or computing system implemented personal or business asset management system, package, program, module, or application; an on-line, or web-based, or computing system implemented personal or business accounting system, package, program, module, or application; on-line, or web-based, or computing system implemented personal or business tax preparation and/or management system, package, program, module, or application or any of the numerous on-line, or web-based, or computing system implemented financial management systems as discussed herein, and/or as known in the art at the time of filing, and/or as developed after the time of filing.

Specific examples of financial management systems currently available include, but are not limited to: Quicken™, available from Intuit Inc. of Mountain View, Calif.; Quicken Online™, available from Intuit Inc. of Mountain View, Calif.; QuickBooks™, available from Intuit Inc. of Mountain View, Calif.; QuickBooks Online™, available from Intuit Inc. of Mountain View, Calif.; Mint.com™, available from Intuit Inc. of Mountain View, Calif.; QuickReceipts™, available from Intuit Inc. of Mountain View, Calif.; Microsoft Money™, available from Microsoft, Inc. of Redmond, Wash.; or various other computing system implemented financial management systems discussed herein, or known to those of skill in the art at the time of filing, or as developed after the time of filing.

In various embodiments, the vendor information database and/or vendor identification data is obtained from one or more third parties and/or third party computing systems and/or databases.

In various embodiments, the vendor information database and/or vendor identification data is obtained using any source, method, means, mechanism, process, procedure, or system as discussed herein, and/or as known in the art at the time of filing, and/or as developed after the time of filing.

In one embodiment, data representing current vendor reporting requirements for a specific jurisdiction and/or agency and/or contact information for any associated reporting agency is obtained and stored.

In one embodiment, data representing current vendor reporting requirements for a specific jurisdiction and/or agency and/or contact information for any associated reporting agency is obtained from one or more government and/or reporting agency sources.

In one embodiment, data representing current vendor reporting requirements for a specific jurisdiction and/or agency and/or contact information for any associated reporting agency is obtained from one or more statutes and/or statue monitoring systems.

In one embodiment, data representing current vendor reporting requirements for a specific jurisdiction and/or agency and/or contact information for any associated reporting agency is obtained from one or more financial management systems.

As a specific example, in various embodiments the data representing current vendor reporting requirements for a specific jurisdiction and/or agency and/or contact information for any associated reporting agency is obtained from any on-line, or web-based, or computing system implemented financial management system as discussed herein, and/or as known in the art at the time of filing, and/or as developed after the time of filing that includes, is accessed by, and/or is otherwise associated with the process for determining business expenditures with vendors and automatically generating and submitting required forms.

In various embodiments, the data representing current vendor reporting requirements for a specific jurisdiction and/or agency and/or contact information for any associated reporting agency is obtained from any one or more third parties and/or third party computing systems and/or databases.

In various embodiments, the data representing current vendor reporting requirements for a specific jurisdiction and/or agency and/or contact information for any associated reporting agency is obtained using any source, method, means, mechanism, process, procedure, or system as discussed herein, and/or as known in the art at the time of filing, and/or as developed after the time of filing.

As a specific example, in the case of the 1099 reporting requirement of the Health Care and Education Reconciliation Act of 2010 (Pub.L. 111-152, 124 Stat. 1029) discussed above, the vendor reporting requirement that any expenditure totaling more than 600.00 a year with a given vendor could be obtained from any of the sources discussed above, and/or as known in the art at the time of filing, and/or as developed after the time of filing.

In one embodiment, data representing electronic versions of one or more forms associated with the reporting requirements for the specific jurisdiction and/or agency is obtained and stored.

In one embodiment, data representing electronic versions of one or more forms associated with the reporting requirements for the specific jurisdiction and/or agency is obtained from one or more government and/or reporting agency sources.

In one embodiment, data representing electronic versions of one or more forms associated with the reporting requirements for the specific jurisdiction and/or agency is obtained from one or more financial management systems, such as a tax management/preparation system, associated with the a business, and/or a provider of the process for determining business expenditures with vendors and automatically generating and submitting required forms.

As a specific example, in various embodiments the data representing electronic versions of one or more forms associated with the reporting requirements for the specific jurisdiction and/or agency is obtained from any on-line, or web-based, or computing system implemented financial management system as discussed herein, and/or as known in the art at the time of filing, and/or as developed after the time of filing that includes, is accessed by, and/or is otherwise associated with the process for determining business expenditures with vendors and automatically generating and submitting required forms.

In various embodiments, the data representing electronic versions of one or more forms associated with the reporting requirements for the specific jurisdiction and/or agency is obtained from any one or more third parties and/or third party computing systems and/or databases.

In various embodiments, the data representing electronic versions of one or more forms associated with the reporting requirements for the specific jurisdiction and/or agency is obtained using any source, method, means, mechanism, process, procedure, or system as discussed herein, and/or as known in the art at the time of filing, and/or as developed after the time of filing.

As a specific example, in the case of the 1099 reporting requirement of the Health Care and Education Reconciliation Act of 2010 (Pub.L. 111-152, 124 Stat. 1029) discussed above, the data representing electronic versions of a 1099 form could be obtained from the IRS, a tax preparation and/or management system, or from any of the sources discussed above, and/or as known in the art at the time of filing, and/or as developed after the time of filing.

In one embodiment, the financial transaction data associated with a business is obtained from one or more sources.

In one embodiment, financial transaction data associated with the business is obtained from one or more sources using a data management system such as any data management system discussed herein, and/or as known in the art at the time of filing, and/or as developed after the time of filing.

In one embodiment, the financial transaction data associated with a business is obtained from one or more financial management systems.

As a specific example, in various embodiments, the financial transaction data associated with a business is obtained from any financial management system that, includes, is accessed by, and/or is otherwise associated with the process for determining business expenditures with vendors and automatically generating and submitting required forms.

As noted above, types of financial management systems currently available include, but are not limited to any of the following: an on-line, or web-based, or computing system implemented personal or business financial management system, package, program, module, or application; an on-line, or web-based, or computing system implemented home or business inventory system, package, program, module, or application; an on-line, or web-based, or computing system implemented personal or business asset management system, package, program, module, or application; an on-line, or web-based, or computing system implemented personal or business accounting system, package, program, module, or application; on-line, or web-based, or computing system implemented personal or business tax preparation and/or management system, package, program, module, or application or any of the numerous on-line, or web-based, or computing system implemented financial management systems as discussed herein, and/or as known in the art at the time of filing, and/or as developed after the time of filing.

As also noted above, specific examples of financial management systems currently available include, but are not limited to: Quicken™, available from Intuit Inc. of Mountain View, Calif.; Quicken Online™, available from Intuit Inc. of Mountain View, Calif.; QuickBooks™, available from Intuit Inc. of Mountain View, Calif.; QuickBooks Online™, available from Intuit Inc. of Mountain View, Calif.; Mint.com™, available from Intuit Inc. of Mountain View, Calif.; Quick-Receipts™, available from Intuit Inc. of Mountain View, Calif.; Microsoft Money™, available from Microsoft, Inc. of Redmond, Wash.; or various other computing system implemented financial management systems discussed herein, or known to those of skill in the art at the time of filing, or as developed after the time of filing.

In one embodiment, the financial transaction data associated with the business obtained by the financial management system includes data associated with financial transactions conducted using multiple payment methods to provide as complete a set of the financial transaction data associated with the business as possible. For instance, in one embodiment, the financial transaction data associated with the business is obtained by the financial management system from, but not limited to, any one or more of the following sources: banks; debit cards and/or accounts; credit unions; credit cards and/or accounts and/or credit card/account providers; asset accounts and/or asset account providers; or other financial resources, accounts and/or services used by the business to pay for and/or conduct financial transactions with one or more vendors.

In addition, in some embodiments, the financial transaction data associated with the business is obtained by the financial management system from multiple sources of the same type. For instance, in one embodiment, the financial transaction data associated with the business is obtained by the financial management system from: two or more banks; two or more debit cards and/or accounts; two or more credit unions; two or more credit cards and/or accounts and/or credit card/account providers; two or more asset accounts and/or asset account providers; and/or two or more other financial resources, accounts and/or services used by the business to pay for and/or conduct financial transactions with one or more vendors.

Financial management systems typically help a business manage their finances by providing a centralized interface with banks, credit card companies, and other various financial institutions and/or accounts, for identifying, processing, storing, and categorizing business financial transactions and other business financial data. Currently, financial management systems typically obtain financial transaction information, such as payee/vendor identification, payee/vendor location, payment amount, date of the transaction, time of transaction, the type of transaction, etc., via communication with banks, credit card providers, or other financial institutions, using electronic data transfer systems such as the Open Financial Exchange (OFX) specification or various other systems for transferring financial transaction data.

As noted above, using financial management systems, the financial transaction information, payee/vendor identification, payee/vendor location, payment amount, date of the transaction, and other data is often used by the financial management system to categorize individual financial transactions as a particular type of income or expense for the business, i.e., categorize individual financial transactions into financial expenditure categories. Some currently offered financial management systems then use this financial transaction information to track events, such as purchase events, and to provide various historical data reports or displays including "to date" data reports such as historical spending data reports in one or more particular categories, for specific products and/or services, or with specific payees, i.e., vendors.

In one embodiment, the financial transaction data associated with the business is analyzed by one or more processors associated with one or more computing systems using at least part of the current vendor reporting requirement data to try and identify/match one or more vendors used by the business that are subject to the reporting requirement and therefore require the preparation and submission of one or more of the one or more forms associated with the reporting requirement.

As a specific example, in the case of the 1099 reporting requirement of the Health Care and Education Reconciliation Act of 2010 (Pub.L. 111-152, 124 Stat. 1029), in one embodiment, the financial transaction data associated with the business is analyzed by one or more processors associated with one or more computing systems to identify all vendors with whom the business has spent $600.00 or more in the past tax year because, under the Act, a 1099 form must be submitted to each of these identified subject vendors.

In one embodiment, one or more subject vendors are identified.

In one embodiment: financial transaction data associated with the business that is related to the identified subject vendors, such as the actual amount spent with the subject vendors, dates of the transactions, and/or items purchased; identification data associated with the subject vendors, such as the subject vendor's EIN/SSN or tax ID number; contact data associated with the subject vendors; contact data associated with any required reporting agency; and data representing the one or more required forms, is automatically gathered and correlated to the respective identified subject vendors using one or more processors associated with one or more computing systems.

In one embodiment, a listing of the one or more identified subject vendors and/or any of the data associated with the identified subject vendors is presented to the business owner for review and/or approval.

As a specific example, in the case of the 1099 reporting requirement of the Health Care and Education Reconciliation Act of 2010 (Pub.L. 111-152, 124 Stat. 1029): financial transaction data associated with the business that is related to the identified subject vendors with whom the business spent $600.00 or more in the previous tax year, such as the actual amount spent with the subject vendors, dates of the transactions, and/or items purchased; identification data associated with the subject vendors with whom the business spent $600.00 or more in the previous tax year, such as the subject vendor's EIN/SSN or tax ID number; contact data associated with the subject vendors with whom the business spent $600.00 or more in the previous tax year; and data representing and IRS 1099 form, is automatically gathered and correlated to the respective identified subject vendors with whom the business spent $600.00 or more in the previous tax year using one or more processors associated with one or more computing systems.

In one embodiment: the financial transaction data associated with the business that is related to the identified subject vendors, such as the actual amount spent with the subject vendors, dates of the transactions, and/or items purchased; the identification data associated with the subject vendors, such as the subject vendor's EIN/SSN or tax ID number; the contact data associated with the subject vendors; and the contact data associated with any required reporting agency is used to automatically fill out, i.e., "auto-fill" the one or more required forms for each identified subject vendor; thereby transforming the one or more required forms into filled out, or completed, or partially completed, forms.

In one embodiment, the auto-filled one or more required forms for each identified subject vendor are presented to the business owner for review and/or approval.

As a specific example, in the case of the 1099 reporting requirement of the Health Care and Education Reconciliation Act of 2010 (Pub.L. 111-152, 124 Stat. 1029): the financial transaction data associated with the business that is related to the identified subject vendors with whom the business spent $600.00 or more in the previous tax year; the identification data associated with the subject vendors with whom the business spent $600.00 or more in the previous tax year; and the contact data associated with the subject vendors with whom the business spent $600.00 or more in the previous tax year is used to auto-fill a 1099 for each identified subject vendor with whom the business spent $600.00 or more in the previous tax year.

In one embodiment, the auto-filled forms associated with the reporting requirement for each of the identified subject vendors are then automatically, or semi-automatically, sent to the respective vendors, and/or the appropriate reporting agency, using the identification data associated with subject vendors and the data representing current vendor reporting requirements.

In one embodiment, the auto-filled forms associated with the reporting requirement for each of the identified subject vendors are automatically, or semi-automatically, sent to the respective vendors, and/or the appropriate reporting agency, using the identification data associated with subject vendors and the data representing current vendor reporting requirements via one or more processors associated with one or more computing systems.

In one embodiment, the auto-filled forms associated with the reporting requirement for each of the identified subject vendors are semi-automatically sent to the respective vendors subject to the review and/or approval of the auto-filled forms by the business owner.

In one embodiment, the auto-filled forms associated with the reporting requirement for each of the identified subject vendors are automatically sent to the respective vendors without review and/or approval of the auto-filled forms by the business owner.

As a specific example, in the case of the 1099 reporting requirement of the Health Care and Education Reconciliation Act of 2010 (Pub.L. 111-152, 124 Stat. 1029), the auto-filled 1099 forms for each of the identified subject vendors with whom the business spent $600.00 or more in the previous tax year are automatically, or semi-automatically, sent to the respective vendors.

In one embodiment, a copy of the submitted forms is automatically retained for access by the business owner. In one embodiment, a copy of the submitted forms is automatically retained for access by the business owner in electronic format via one or more processors associated with one or more computing systems.

In one embodiment, a copy of the submitted forms is automatically retained for access by the business owner in electronic format in a database and/or memory under the control of, and/or accessible by, the business owner, and/or a provider of the process for determining business expenditures with vendors and automatically generating and submitting required forms, and/or a third party.

In one embodiment, a copy of the submitted forms is automatically retained for access by the business owner in electronic format on a web-page, or via a web-based function, under the control of, and/or accessible by, the business owner, and/or a provider of the process for determining business expenditures with vendors and automatically generating and submitting required forms, and/or a third party.

Using the process for determining business expenditures with vendors and automatically generating and submitting required forms, as discussed herein, the expenditures made by a business with its vendors is tracked automatically by analyzing already existing financial transaction data associated with the business and vendors subject to a reporting requirement are automatically identified and correlated with their vendor identification data, and any reporting agency contact data. Then, using the process for determining business expenditures with vendors and automatically generating and submitting required forms, as discussed herein, the already existing financial transaction data associated with the business, and the vendor identification data and any reporting agency contact data, is used to automatically, or semi-automatically, fill out the required forms, submit them to the subject vendors and/or reporting agencies, and a copy of the submitted forms is automatically saved for further use/evidence.

Consequently, using the process for determining business expenditures with vendors and automatically generating and submitting required forms, as discussed herein, the business owner is spared the considerable burden and use of resources currently required for: tracking expenditures with all vendors; identifying subject vendors with which the business spends some threshold amount, or more; obtaining the proper identification and contact information for each subject vendor, such as the subject vendor's EIN/SSN number; gathering the expenditure data associated with all the subject vendors; obtaining the appropriate one or more forms required; using the expenditure data to fill out one or more required forms, for each subject vendor; submitting the required forms to the each subject vendor and/or the proper agency; and then creating and retaining proof of these actions for each subject vendor.

As a result, using the process for determining business expenditures with vendors and automatically generating and submitting required forms, as discussed herein, a business owner can devote these saved resources to creating a more efficient and profitable business, thereby benefitting both the business and the economy as a whole.

Hardware System Architecture

FIG. 1 is a block diagram of an exemplary hardware architecture for implementing one embodiment of a system and method for determining business expenditures with vendors and automatically generating and submitting required forms, such as exemplary process 200, discussed herein, that includes: a business computing system 100, e.g., a first computing system; a vendor computing system 150, e.g., a second computing system; a provider computing system 120, e.g., a third computing system; and a database 170, all operatively coupled by a network 130.

As seen in FIG. 1, business computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as, but not limited to: a computing system implemented personal financial management system; a computing system implemented business financial management system; a computing system implemented tax preparation and/or management system a computing system implemented personal accounting system; a computing system implemented business accounting system; a computing system implemented tax preparation and/or management system; a computing system implemented healthcare management system; or any other computing system implemented personal and/or business data management system, as discussed herein, and/or as known in the art at the time of filing, and/or as developed after the time of filing. In one embodiment, computing system implemented financial management system 180 is stored, in whole, or in part, in memory system 103, and is used by, or includes, as discussed below, a process for determining business expenditures with vendors and automatically generating and submitting required forms, such as exemplary process 200 discussed below.

Business computing system 100 may further include standard consumer interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other device capable of inputting data to, and outputting data from, business computing system 100, whether available or known at the time of filing or as later developed. As discussed in more detail below, in one embodiment, a process for determining business expenditures with vendors and automatically generating and submitting required forms and/or a computing system implemented financial management system is entered, in whole, or in part, into business computing system 100 via I/O device 113, such as from a CD, DVD, floppy disk, portable hard drive, memory stick, download site, or other medium and/or computer program product as defined herein.

In one embodiment, business computing system 100 also includes an Internet browser 182 that, in one embodiment, is stored, in whole, or in part in memory 103.

In one embodiment, business computing system 100 is a computing system accessible by a provider of a process for determining business expenditures with vendors and automatically generating and submitting required forms and is used and/or accessible by another computing system, such as provider computing system 120 (discussed below).

In one embodiment, business computing system 100 is any computing system discussed herein, and/or as known in the art at the time of filing, and/or as developed after the time of filing, such as, but not limited to, a desktop computing system, a laptop computing system, a notebook computing system, a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for determining business expenditures with vendors and automatically generating and submitting required forms, and/or a computing system implemented financial management system, in accordance with at least one of the embodiments as described herein.

Similarly, vendor computing system 150 typically includes a CPU 151, an input/output (I/O) interface 155, and a memory system 153, including cache memory 153A. Similar to business computing system 100, vendor computing system 150 may further include standard consumer interface devices such as a keyboard 157, a mouse 161, a printer 159, and a display device 165, as well as, one or more standard input/output (I/O) devices 163, such as a compact disk (CD) or DVD drive, floppy disk drive, or other device capable of inputting data to, and outputting data from, vendor computing system 150, whether available or known at the time of filing or as later developed.

In one embodiment, vendor computing system 150 is accessible by a provider of process for determining business expenditures with vendors and automatically generating and submitting required forms 200 and/or provider computing system 120, and, in one embodiment, memory system 153 includes customer/forms data 156 such as all, or part of, filled out forms associated with a business and required by one or more vendor reporting requirements, such as discussed below.

In one embodiment, all, or part of, a process for determining business expenditures with vendors and automatically generating and submitting required forms, and/or a computing system implemented financial management system, can also be loaded, in whole, or in part, into vendor computing system 150 from business computing system 100 for storage in memory system 153 and/or cache memory 153A.

In one embodiment, vendor computing system 150 is any computing system discussed herein, and/or as known in the art at the time of filing, and/or as developed after the time of filing, such as, but not limited to, a desktop computing system, a laptop computing system, a notebook computing system, a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for determining business expenditures with vendors and automatically generating and submitting required forms, and/or a computing system implemented financial management system, in accordance with at least one of the embodiments as described herein.

Also shown in FIG. 1 is exemplary database 170. In one embodiment, database 170 is a data storage device, a designated server system or computing system, or a designated portion of one or more server systems or computing systems, such as computing systems 100, 150 and 120, or a distributed database, or an external and/or portable hard drive. In one embodiment, database 170 is a dedicated mass storage device implemented in software, hardware, or a combination of hardware and software. In one embodiment, database 170 is a web-based function.

In one embodiment, database 170 is a vendor information database, as discussed below, and includes vendor data 172, such as, but not limited to, data mapping one or more vendors to their associated identification data such as employer identification numbers (EIN), business tax identification number, Social Security Number (SSN), and/or contact information, such as mailing address, e-mail address, etc.

In one embodiment, database 170 includes requirement data 174 such as, but not limited to, data representing current vendor reporting requirements for a specific jurisdiction and/or agency and/or contact information for any associated reporting agency.

In one embodiment, database 170 includes form data 176 such as, but not limited to, data representing electronic versions of one or more forms associated with the reporting requirements for the specific jurisdiction and/or agency.

In one embodiment, computing systems 100 and 150, and database 170, are coupled to a provider computing system 120 through network 130. In one embodiment, provider computing system 120 typically includes a display device 125, a CPU 121, a network interface 122, and a memory 124. In one embodiment, memory 124 includes all, or part, of an on-line financial management system 123 and all, or part, of process for determining business expenditures with vendors and automatically generating and submitting required forms, such as exemplary process 200.

In one embodiment, memory 124 also includes all, or part of, business transactional data 126 such as financial transaction data associated with the business that indicates transactions with one or more vendors.

In one embodiment, memory 124 also includes all, or part of, vendor data 172, such as, but not limited to, data mapping one or more vendors to their associated identification data such as employer identification numbers (EIN), business tax identification number, Social Security Number (SSN), and/or contact information, such as mailing address, e-mail address, etc.

In one embodiment, memory 124 also includes all, or part of, requirement data 174 such as, but not limited to, data representing current vendor reporting requirements for a specific jurisdiction and/or agency and/or contact information for any associated reporting agency.

In one embodiment, memory 124 also includes all, or part of, form data 176 such as, but not limited to, data representing electronic versions of one or more forms associated with the reporting requirements for the specific jurisdiction and/or agency.

In one embodiment, on-line financial management system 123 includes any on-line financial management system such as, but not limited to: an on-line personal financial management system; an on-line business financial management system; an on-line personal accounting system; an on-line business accounting system; an on-line tax preparation and/or management system; an on-line healthcare management system; or any other an on-line personal and/or business data management system, as discussed herein, and/or as known in the art at the time of filing, and/or as developed after the time of filing.

In one embodiment, provider computing system 120 is a web-page server.

In one embodiment, provider computing system 120 is used in a station-to-station arrangement, such as a peer-to-peer, or hybrid peer-to peer, arrangement, as an indexing and/or central server used to connect a first computing system, such as business computing system 100, and a second computing system, such as vendor computing system 150.

In one embodiment, provider computing system 120 is any computing system discussed herein, and/or as known in the art at the time of filing, and/or as developed after the time of filing, such as, but not limited to, a desktop computing system, a laptop computing system, a notebook computing system, a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for determining business expenditures with vendors and automatically generating and submitting required forms, and/or a computing system implemented financial management system, in accordance with at least one of the embodiments as described herein.

Network 130 can be any network or network system that is of interest to a consumer such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

In one embodiment, computing systems 100 and 150, and database 170, provider computing system 120 and network 130 are part of a cloud computing environment.

Those of skill in the art will readily recognize that the components shown in FIG. 1, such as computing systems 100 and 150, database 170, provider computing system 120, and their respective components, are shown for illustrative purposes only and that architectures with more or fewer components can implement, and benefit from, the invention. Moreover, one or more components of business computing system 100, vendor computing system 150, database 170, and provider computing system 120 may be located remotely from their respective system and accessed via network, as discussed herein. In addition, the particular type of, and configuration of, computing systems 100 and 150, database 170, and provider computing system 120 are not relevant.

Although a process for determining business expenditures with vendors and automatically generating and submitting required forms, such as process for determining business expenditures with vendors and automatically generating and submitting required forms 200, and/or a computing system implemented financial management system, such as computing system implemented financial management system 180, and/or on-line financial management system 123, are sometimes referred to herein, alternatively, as a process, an application, a module, a program, a component of a software system, a component of a software package, a component of a parent system, a plug-in, or a feature of a parent system, this terminology is illustrative only. In some embodiments, a process for determining business expenditures with vendors and automatically generating and submitting required forms, such as process for determining business expenditures with vendors and automatically generating and submitting required forms 200, and/or a financial management system, such as a computing system implemented financial management system 180 and/or on-line financial management system 123, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or CPU 121. In one embodiment, execution of a process by CPU 101, CPU 151, or CPU 121, results in the operations of an agent computer process (not shown) and/or a rule computer process (not shown).

In one embodiment, a process for determining business expenditures with vendors and automatically generating and submitting required forms, such as process for determining business expenditures with vendors and automatically generating and submitting required forms 200, and/or a financial management system, such as a computing system implemented financial management system 180 and/or on-line financial management system 123, and/or various other data discussed herein, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as provider computing system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "network" includes any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, known at the time of filing, or as developed thereafter.

In accordance with one embodiment, using a process for determining business expenditures with vendors and automatically generating and submitting required forms a vendor information database mapping one or more vendors to their associated identification data such as employer identification numbers (EIN), business tax identification number, Social Security Number (SSN), and/or contact information, such as mailing address, e-mail address, etc. is created and/or made accessible by the method and system for determining business expenditures with vendors and automatically generating and submitting required forms. In one embodiment, data representing current vendor reporting requirements for a specific jurisdiction and/or agency and/or contact information for any associated reporting agency is obtained and stored. In one embodiment, data representing electronic versions of one or more forms associated with the reporting requirements for the specific jurisdiction and/or agency is obtained and stored. In one embodiment, financial transaction data associated with a business is obtained from one or more sources, in one embodiment through a financial management system used by the business. In one embodiment, the financial transaction data associated with the business is analyzed using at least part of the current vendor reporting requirement data to try and identify/match one or more vendors used by the business that are subject to the reporting requirement and therefore require the preparation and submission of one or more of the one or more forms associated with the reporting requirement. In one embodiment, one or more subject vendors are identified. In one embodiment, at least part of the identification data associated with subject vendors, and at least part of the financial transaction data associated with the business, is used to auto-fill at least part of the one or more forms associated with the reporting requirement for each of the identified subject vendors. In one embodiment, the auto-filled forms associated with the reporting requirement for each of the identified subject vendors is then automatically sent to the respective vendors, and/or the appropriate reporting agency, using the identification data associated with subject vendors and the data representing current vendor reporting requirements. In one embodiment, a copy of the submitted forms is also automatically retained for access by the business owner.

Figure 2:
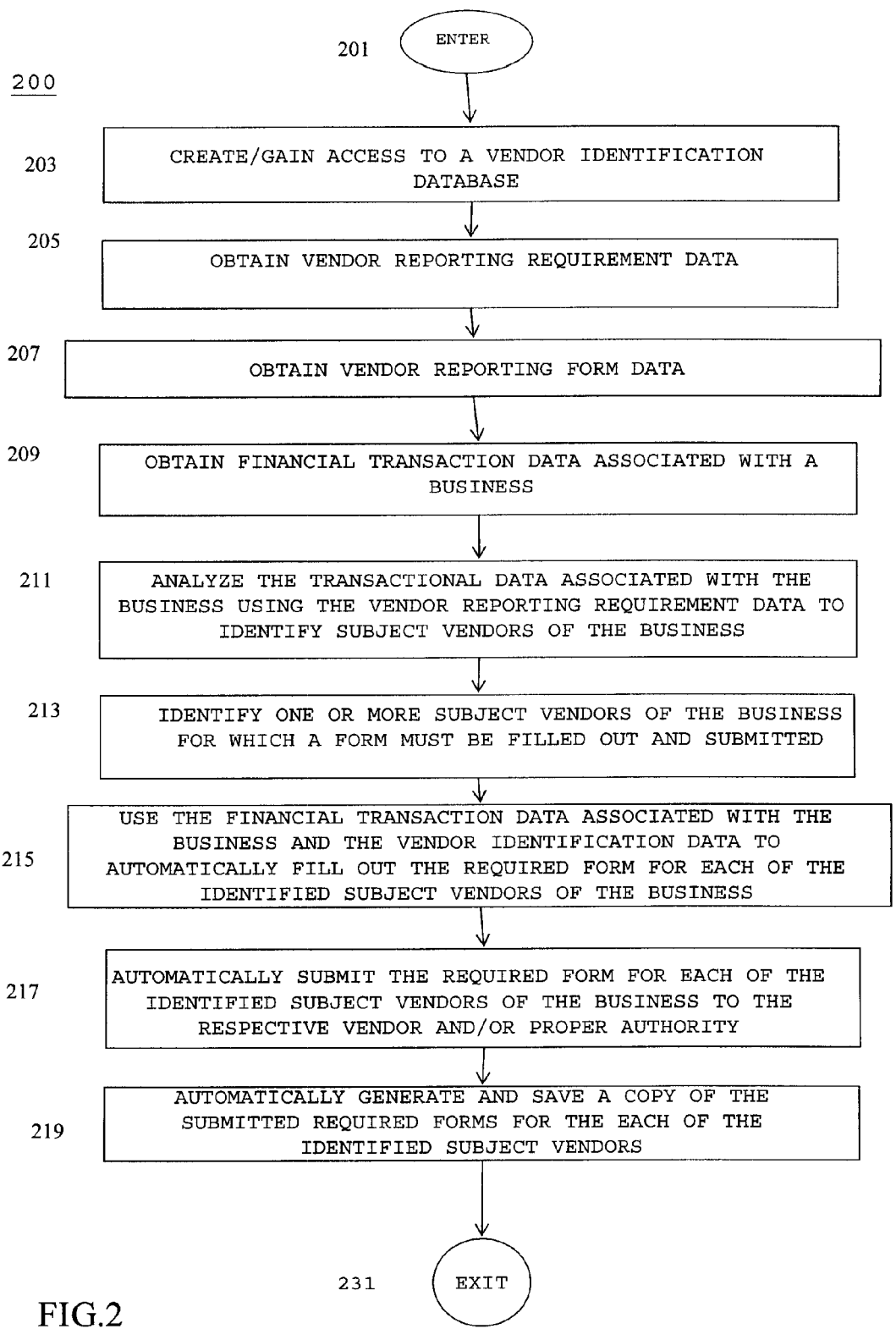
FIG. 2 is a flow chart depicting a process for determining business expenditures with vendors and automatically generating and submitting required forms in accordance with one embodiment.

FIG. 2 a flow chart depicting a process for determining business expenditures with vendors and automatically generating and submitting required forms 200 in accordance with one embodiment. Process for determining business expenditures with vendors and automatically generating and submitting required forms 200 begins at ENTER OPERATION 201 of FIG. 2 and process flow proceeds to CREATE/GAIN ACCESS TO A VENDOR IDENTIFICATION DATABASE OPERATION 203.

In one embodiment, at CREATE/GAIN ACCESS TO A VENDOR IDENTIFICATION DATABASE OPERATION 203 a vendor information database mapping one or more vendors to their associated identification data and/or contact information is created and/or made accessible by process for determining business expenditures with vendors and automatically generating and submitting required forms 200.

In one embodiment, at CREATE/GAIN ACCESS TO A VENDOR IDENTIFICATION DATABASE OPERATION 203 a vendor information database mapping one or more vendors to their associated identification data such as employer identification numbers (EIN), business tax identification number, Social Security Number (SSN), and/or contact information, such as mailing address, e-mail address, etc. is created and/or made accessible to process for determining business expenditures with vendors and automatically generating and submitting required forms 200.

In various embodiments, at CREATE/GAIN ACCESS TO A VENDOR IDENTIFICATION DATABASE OPERATION 203, the vendor information database and/or vendor identification data is obtained from one or more financial management systems.

In various embodiments, at CREATE/GAIN ACCESS TO A VENDOR IDENTIFICATION DATABASE OPERATION 203, the vendor information database and/or vendor identification data is obtained from one or more financial management systems, such as financial management systems 180 and/or 123 of FIG. 1.

Returning to FIG. 2, as a specific example, in various embodiments, the vendor information database and/or vendor identification data is obtained at CREATE/GAIN ACCESS TO A VENDOR IDENTIFICATION DATABASE OPERATION 203 from any financial management system that, includes, is accessed by, and/or is otherwise associated with process for determining business expenditures with vendors and automatically generating and submitting required forms 200.

Types of financial management systems currently available include, but are not limited to any of the following: an on-line, or web-based, or computing system implemented personal or business financial management system, package, program, module, or application; an on-line, or web-based, or computing system implemented home or business inventory system, package, program, module, or application; an on-line, or web-based, or computing system implemented personal or business asset management system, package, program, module, or application; an on-line, or web-based, or computing system implemented personal or business accounting system, package, program, module, or application; on-line, or web-based, or computing system implemented personal or business tax preparation and/or management system, package, program, module, or application or any of the numerous on-line, or web-based, or computing system implemented financial management systems as discussed herein, and/or as known in the art at the time of filing, and/or as developed after the time of filing.

Specific examples of financial management systems currently available include, but are not limited to: Quicken™, available from Intuit Inc. of Mountain View, Calif.; Quicken Online™, available from Intuit Inc. of Mountain View, Calif.; QuickBooks™, available from Intuit Inc. of Mountain View, Calif.; QuickBooks Online™, available from Intuit Inc. of Mountain View, Calif.; Mint.com™, available from Intuit Inc. of Mountain View, Calif.; QuickReceipts™, available from Intuit Inc. of Mountain View, Calif.; Microsoft Money™, available from Microsoft, Inc. of Redmond, Wash.; or various other computing system implemented financial management systems discussed herein, or known to those of skill in the art at the time of filing, or as developed after the time of filing.

In various embodiments, the vendor information database and/or vendor identification data is obtained at CREATE/GAIN ACCESS TO A VENDOR IDENTIFICATION DATABASE OPERATION 203 from one or more third parties and/or third party computing systems and/or databases.

In various embodiments, the vendor information database and/or vendor identification data of CREATE/GAIN ACCESS TO A VENDOR IDENTIFICATION DATABASE OPERATION 203 is obtained using any source, method, means, mechanism, process, procedure, or system as discussed herein, and/or as known in the art at the time of filing, and/or as developed after the time of filing.

In various embodiments, the vendor information database of CREATE/GAIN ACCESS TO A VENDOR IDENTIFICATION DATABASE OPERATION 203 is any database, such as data base 170 of FIG. 1. In various embodiments, the vendor information database of CREATE/GAIN ACCESS TO A VENDOR IDENTIFICATION DATABASE OPERATION 203 is any database, as discussed herein, and/or as known in the art at the time of filing, and/or as developed after the time of filing.

In various embodiments, the data representing current vendor reporting requirements for a specific jurisdiction and/or agency and/or contact information for any associated reporting agency of CREATE/GAIN ACCESS TO A VENDOR IDENTIFICATION DATABASE OPERATION 203 is vendor data 172 of FIG. 1 and is obtained from/stored on any one or more databases, such as database 170 of FIG. 1.

Returning to FIG. 2, in one embodiment, once a vendor information database mapping one or more vendors to their associated identification data and/or contact information is created and/or made accessible by process for determining business expenditures with vendors and automatically generating and submitting required forms 200 at CREATE/GAIN ACCESS TO A VENDOR IDENTIFICATION DATABASE OPERATION 203, process flow proceeds to OBTAIN VENDOR REPORTING REQUIREMENT DATA OPERATION 205.

In one embodiment, at OBTAIN VENDOR REPORTING REQUIREMENT DATA OPERATION 205 data representing current vendor reporting requirements for a specific jurisdiction and/or agency and/or contact information for any associated reporting agency is obtained and stored.

In one embodiment, at OBTAIN VENDOR REPORTING REQUIREMENT DATA OPERATION 205 data representing current vendor reporting requirements for a specific jurisdiction and/or agency and/or contact information for any associated reporting agency is obtained from one or more government and/or reporting agency sources.

In one embodiment, at OBTAIN VENDOR REPORTING REQUIREMENT DATA OPERATION 205 data representing current vendor reporting requirements for a specific jurisdiction and/or agency and/or contact information for any associated reporting agency is obtained from one or more statutes and/or statue monitoring systems.

In one embodiment, at OBTAIN VENDOR REPORTING REQUIREMENT DATA OPERATION 205 data representing current vendor reporting requirements for a specific jurisdiction and/or agency and/or contact information for any associated reporting agency is obtained from one or more financial management systems, such as financial management systems 180 and/or 123 of FIG. 1.

Returning to FIG. 2, as a specific example, in various embodiments the data representing current vendor reporting requirements for a specific jurisdiction and/or agency and/or contact information for any associated reporting agency is obtained from any on-line, or web-based, or computing system implemented financial management system as discussed herein, and/or as known in the art at the time of filing, and/or as developed after the time of filing that includes, is accessed by, and/or is otherwise associated with the process for determining business expenditures with vendors and automatically generating and submitting required forms.

In various embodiments, at OBTAIN VENDOR REPORTING REQUIREMENT DATA OPERATION 205 the data representing current vendor reporting requirements for a specific jurisdiction and/or agency and/or contact information for any associated reporting agency is requirement data 174 of FIG. 1 and is obtained from/stored on any one or more databases, such as database 170 of FIG. 1.

Returning to FIG. 2, in various embodiments, at OBTAIN VENDOR REPORTING REQUIREMENT DATA OPERATION 205 the data representing current vendor reporting requirements for a specific jurisdiction and/or agency and/or contact information for any associated reporting agency, such as requirement data 174 of FIG. 1, is obtained from any one or more third parties and/or third party computing systems and/or databases.

Returning to FIG. 2, in various embodiments, at OBTAIN VENDOR REPORTING REQUIREMENT DATA OPERATION 205 the data representing current vendor reporting requirements for a specific jurisdiction and/or agency and/or contact information for any associated reporting agency is obtained using any source, method, means, mechanism, process, procedure, or system as discussed herein, and/or as known in the art at the time of filing, and/or as developed after the time of filing.

In various embodiments, at OBTAIN VENDOR REPORTING REQUIREMENT DATA OPERATION 205 the data representing current vendor reporting requirements for a specific jurisdiction and/or agency and/or contact information for any associated reporting agency is stored in a memory system, or database, or in a cache memory, or in any main memory or mass memory, associated with any computing system as discussed herein, and/or as known in the art at the time of filing, and/or as developed after the time of filing.

In various embodiments, at OBTAIN VENDOR REPORTING REQUIREMENT DATA OPERATION 205 the data representing current vendor reporting requirements for a specific jurisdiction and/or agency and/or contact information for any associated reporting agency, in whole, or in part, is stored in any computing system, such as business computing system 100 and/or vendor computing system 150 of FIG. 1, and/or server system, such as provider computing system 120 of FIG. 1, and/or a database, such as database 170 of FIG. 1, or any other device, in another location, or on/in a computer readable medium, and/or any other computer program product, as defined herein.

In various embodiments, at OBTAIN VENDOR REPORTING REQUIREMENT DATA OPERATION 205 the data representing current vendor reporting requirements for a specific jurisdiction and/or agency and/or contact information for any associated reporting agency, in whole, or in part, is stored on a webpage, in a web-based system or on a public network such as the Internet.

As a specific example, in the case of the 1099 reporting requirement of the Health Care and Education Reconciliation Act of 2010 (Pub.L. 111-152, 124 Stat. 1029) discussed above, the vendor reporting requirement that any expenditures totaling more than 600.00 a year with a given vendor could be obtained at OBTAIN VENDOR REPORTING REQUIREMENT DATA OPERATION 205 from any of the sources discussed above, and/or as known in the art at the time of filing, and/or as developed after the time of filing and then stored using any of the methods discussed above, and/or as known in the art at the time of filing, and/or as developed after the time of filing.

In one embodiment, once data representing current vendor reporting requirements for a specific jurisdiction and/or agency and/or contact information for any associated reporting agency is obtained and stored at OBTAIN VENDOR REPORTING REQUIREMENT DATA OPERATION 205, process flow proceeds to OBTAIN VENDOR REPORTING FORM DATA OPERATION 207.

In one embodiment, at OBTAIN VENDOR REPORTING FORM DATA OPERATION 207 data representing one or more forms associated with the reporting requirements for the specific jurisdiction and/or agency is obtained and stored.

In one embodiment, at OBTAIN VENDOR REPORTING FORM DATA OPERATION 207 data representing electronic versions of one or more forms associated with the reporting requirements for the specific jurisdiction and/or agency is obtained from one or more government and/or reporting agency sources.

In one embodiment, at OBTAIN VENDOR REPORTING FORM DATA OPERATION 207 data representing electronic versions of one or more forms associated with the reporting requirements for the specific jurisdiction and/or agency is obtained from one or more financial management systems, such as financial management systems 180 and/or 123 of FIG. 1, and/or a tax management/preparation system, associated with the a business, and/or a provider of process for determining business expenditures with vendors and automatically generating and submitting required forms 200.

As a specific example, in various embodiments the data representing electronic versions of one or more forms associated with the reporting requirements for the specific jurisdiction and/or agency is obtained from any on-line, or web-based, or computing system implemented financial management system as discussed herein, and/or as known in the art at the time of filing, and/or as developed after the time of filing that includes, is accessed by, and/or is otherwise associated with, process for determining business expenditures with vendors and automatically generating and submitting required forms 200.

In various embodiments, at OBTAIN VENDOR REPORTING FORM DATA OPERATION 207 the data representing electronic versions of one or more forms associated with the reporting requirements for the specific jurisdiction and/or agency is obtained from any one or more third parties and/or third party computing systems and/or databases.

In various embodiments, at OBTAIN VENDOR REPORTING FORM DATA OPERATION 207 the data representing electronic versions of one or more forms associated with the reporting requirements for the specific jurisdiction and/or agency is form data 176 of FIG. 1 and is obtained and/or stored on database 170 of FIG. 1.

Returning to FIG. 2, in various embodiments, at OBTAIN VENDOR REPORTING FORM DATA OPERATION 207 the data representing electronic versions of one or more forms associated with the reporting requirements for the specific jurisdiction and/or agency is obtained using any source, method, means, mechanism, process, procedure, or system as discussed herein, and/or as known in the art at the time of filing, and/or as developed after the time of filing.

In various embodiments, at OBTAIN VENDOR REPORTING FORM DATA OPERATION 207 the data representing electronic versions of one or more forms associated with the reporting requirements for the specific jurisdiction and/or agency is stored in a memory system, or database, or in a cache memory, or in any main memory or mass memory, associated with any computing system as discussed herein, and/or as known in the art at the time of filing, and/or as developed after the time of filing.

In various embodiments, at OBTAIN VENDOR REPORTING FORM DATA OPERATION 207 the data representing electronic versions of one or more forms associated with the reporting requirements for the specific jurisdiction and/or agency, in whole, or in part, is stored in any computing system, such as business computing system 100 and/or vendor computing system 150 of FIG. 1, and/or server system, such as provider computing system 120 of FIG. 1, and/or a database, such as database 170 of FIG. 1, or any other device, in another location, or on/in a computer readable medium, and/or any other computer program product, as defined herein.

In various embodiments, at OBTAIN VENDOR REPORTING FORM DATA OPERATION 207 the data representing electronic versions of one or more forms associated with the reporting requirements for the specific jurisdiction and/or agency, in whole, or in part, is stored on a webpage, in a web-based system or on a public network such as the Internet.

As a specific example, in the case of the 1099 reporting requirement of the Health Care and Education Reconciliation Act of 2010 (Pub.L. 111-152, 124 Stat. 1029) discussed above, the data representing electronic versions of a 1099 form could be obtained from the IRS, a tax preparation and/or management system, or from any of the sources discussed above, and/or as known in the art at the time of filing, and/or as developed after the time of filing and then stored using any of the methods discussed above, and/or as known in the art at the time of filing, and/or as developed after the time of filing.

In one embodiment, once data representing one or more forms associated with the reporting requirements for the specific jurisdiction and/or agency is obtained and stored at OBTAIN VENDOR REPORTING FORM DATA OPERA- TION 207, process flow proceeds to OBTAIN FINANCIAL TRANSACTION DATA ASSOCIATED WITH A BUSINESS OPERATION 209.

In one embodiment, at OBTAIN FINANCIAL TRANSACTION DATA ASSOCIATED WITH A BUSINESS OPERATION 209 financial transaction data associated with a business is obtained from one or more sources.

In one embodiment, at OBTAIN FINANCIAL TRANSACTION DATA ASSOCIATED WITH A BUSINESS OPERATION 209 the financial transaction data associated with a business is obtained from one or more sources.

In one embodiment, at OBTAIN FINANCIAL TRANSACTION DATA ASSOCIATED WITH A BUSINESS OPERATION 209 financial transaction data associated with the business is obtained from one or more sources using a data management system such as any data management system discussed herein, and/or as known in the art at the time of filing, and/or as developed after the time of filing.

In one embodiment, at OBTAIN FINANCIAL TRANSACTION DATA ASSOCIATED WITH A BUSINESS OPERATION 209 the financial transaction data associated with a business is obtained from one or more financial management systems.

In one embodiment, at OBTAIN FINANCIAL TRANSACTION DATA ASSOCIATED WITH A BUSINESS OPERATION 209 the financial transaction data associated with a business is obtained from one or more financial management systems, such as financial management systems 180 and/or 123 of FIG. 1.

Returning to FIG. 2, as a specific example, in various embodiments, at OBTAIN FINANCIAL TRANSACTION DATA ASSOCIATED WITH A BUSINESS OPERATION 209 the financial transaction data associated with a business is obtained from any financial management system that, includes, is accessed by, and/or is otherwise associated with process for determining business expenditures with vendors and automatically generating and submitting required forms 200.

As noted above, types of financial management systems currently available include, but are not limited to any of the following: an on-line, or web-based, or computing system implemented personal or business financial management system, package, program, module, or application; an on-line, or web-based, or computing system implemented home or business inventory system, package, program, module, or application; an on-line, or web-based, or computing system implemented personal or business asset management system, package, program, module, or application; an on-line, or web-based, or computing system implemented personal or business accounting system, package, program, module, or application; on-line, or web-based, or computing system implemented personal or business tax preparation and/or management system, package, program, module, or application or any of the numerous on-line, or web-based, or computing system implemented financial management systems as discussed herein, and/or as known in the art at the time of filing, and/or as developed after the time of filing.

As also noted above, specific examples of financial management systems currently available include, but are not limited to: Quicken™, available from Intuit Inc. of Mountain View, Calif.; Quicken Online™, available from Intuit Inc. of Mountain View, Calif.; QuickBooks™, available from Intuit Inc. of Mountain View, Calif.; QuickBooks Online™, available from Intuit Inc. of Mountain View, Calif.; Mint.com™, available from Intuit Inc. of Mountain View, Calif.; Quick-Receipts™, available from Intuit Inc. of Mountain View, Calif.; Microsoft Money™, available from Microsoft, Inc. of Redmond, Wash.; or various other computing system implemented financial management systems discussed herein, or known to those of skill in the art at the time of filing, or as developed after the time of filing.

In one embodiment, the financial transaction data associated with the business obtained at OBTAIN FINANCIAL TRANSACTION DATA ASSOCIATED WITH A BUSINESS OPERATION 209 includes data associated with financial transactions conducted using multiple payment methods to provide as complete a set of the financial transaction data associated with the business as possible. For instance, in one embodiment, the financial transaction data associated with the business is obtained at OBTAIN FINANCIAL TRANSACTION DATA ASSOCIATED WITH A BUSINESS OPERATION 209 from, but not limited to, any one or more of the following sources: banks; debit cards and/or accounts; credit unions; credit cards and/or accounts and/or credit card/account providers; asset accounts and/or asset account providers; or other financial resources, accounts and/or services used by the business to pay for and/or conduct financial transactions with one or more vendors.

In addition, in some embodiments, the financial transaction data associated with the business is obtained at OBTAIN FINANCIAL TRANSACTION DATA ASSOCIATED WITH A BUSINESS OPERATION 209 from multiple sources of the same type. For instance, in one embodiment, the financial transaction data associated with the business is obtained at OBTAIN FINANCIAL TRANSACTION DATA ASSOCIATED WITH A BUSINESS OPERATION 209 from: two or more banks; two or more debit cards and/or accounts; two or more credit unions; two or more credit cards and/or accounts and/or credit card/account providers; two or more asset accounts and/or asset account providers; and/or two or more other financial resources, accounts and/or services used by the business to pay for and/or conduct financial transactions with one or more vendors.

Financial management systems typically help a business manage their finances by providing a centralized interface with banks, credit card companies, and other various financial institutions and/or accounts, for identifying, processing, storing, and categorizing business financial transactions and other business financial data. Currently, financial management systems typically obtain financial transaction information, such as payee/vendor identification, payee/vendor location, payment amount, date of the transaction, time of transaction, the type of transaction, etc., via communication with banks, credit card providers, or other financial institutions, using electronic data transfer systems such as the Open Financial Exchange (OFX) specification or various other systems for transferring financial transaction data.

As noted above, using financial management systems, the financial transaction information, payee/vendor identification, payee/vendor location, payment amount, date of the transaction, and other data is often used by the financial management system to categorize individual financial transactions as a particular type of income or expense for the business, i.e., categorize individual financial transactions into financial expenditure categories. Some currently offered financial management systems then use this financial transaction information to track events, such as purchase events, and to provide various historical data reports or displays including "to date" data reports such as historical spending data reports in one or more particular categories, for specific products and/or services, or with specific payees, i.e., vendors.

In various embodiments, the financial transaction data associated with a business is obtained from one or more sources at OBTAIN FINANCIAL TRANSACTION DATA ASSOCIATED WITH A BUSINESS OPERATION 209 using any means, method, process, procedure, and/or system, as discussed herein, and/or as known in the art at the time of filing, and/or as developed after the time of filing.

In various embodiments, the financial transaction data associated with a business obtained from one or more sources at OBTAIN FINANCIAL TRANSACTION DATA ASSOCIATED WITH A BUSINESS OPERATION 209 is stored in a memory system, or database, or in a cache memory, or in any main memory or mass memory, associated with any computing system as discussed herein, and/or as known in the art at the time of filing, and/or as developed after the time of filing.

In various embodiments, the financial transaction data associated with a business obtained from one or more sources at OBTAIN FINANCIAL TRANSACTION DATA ASSOCIATED WITH A BUSINESS OPERATION 209, in whole, or in part, is stored in any computing system, such as business computing system 100 and/or vendor computing system 150 of FIG. 1, and/or server system, such as provider computing system 120 of FIG. 1, and/or a database, such as database 170 of FIG. 1, or any other device, in another location, or on/in a computer readable medium, and/or any other computer program product, as defined herein.

In various embodiments, the financial transaction data associated with a business obtained from one or more sources at OBTAIN FINANCIAL TRANSACTION DATA ASSOCIATED WITH A BUSINESS OPERATION 209, in whole, or in part, is stored on a webpage, in a web-based system or on a public network such as the Internet.

In one embodiment, once financial transaction data associated with a business is obtained from one or more sources at OBTAIN FINANCIAL TRANSACTION DATA ASSOCIATED WITH A BUSINESS OPERATION 209, process flow proceeds to ANALYZE THE TRANSACTIONAL DATA ASSOCIATED WITH THE BUSINESS USING THE VENDOR REPORTING REQUIREMENT DATA TO IDENTIFY SUBJECT VENDORS OF THE BUSINESS OPERATION 211.

In one embodiment, at ANALYZE THE TRANSACTIONAL DATA ASSOCIATED WITH THE BUSINESS USING THE VENDOR REPORTING REQUIREMENT DATA TO IDENTIFY SUBJECT VENDORS OF THE BUSINESS OPERATION 211 the financial transaction data associated with the business of OBTAIN FINANCIAL TRANSACTION DATA ASSOCIATED WITH A BUSINESS OPERATION 209 is analyzed using at least part of the current vendor reporting requirement data of OBTAIN VENDOR REPORTING REQUIREMENT DATA OPERATION 205 to identify/match one or more vendors used by the business that are subject to the reporting requirement and therefore require the preparation and submission of one or more of one or more forms of OBTAIN VENDOR REPORTING FORM DATA OPERATION 207 associated with the reporting requirement.

In one embodiment, at ANALYZE THE TRANSACTIONAL DATA ASSOCIATED WITH THE BUSINESS USING THE VENDOR REPORTING REQUIREMENT DATA TO IDENTIFY SUBJECT VENDORS OF THE BUSINESS OPERATION 211 the financial transaction data associated with the business of OBTAIN FINANCIAL TRANSACTION DATA ASSOCIATED WITH A BUSINESS OPERATION 209 is analyzed by one or more processors, such as CPU 101, CPU 151, and/or processor 121 of FIG. 1, associated with one or more computing systems, such as business computing system 100, vendor computing system 150 and/or provider computing system 120 of FIG. 1 using at least part of the current vendor reporting requirement data of OBTAIN VENDOR REPORTING REQUIREMENT DATA OPERATION 205 to identify/match one or more vendors used by the business that are subject to the reporting requirement and therefore require the preparation and submission of one or more of one or more forms of OBTAIN VENDOR REPORTING FORM DATA OPERATION 207 associated with the reporting requirement.

Returning to FIG. 1, as a specific example, in the case of the 1099 reporting requirement of the Health Care and Education Reconciliation Act of 2010 (Pub.L. 111-152, 124 Stat. 1029), in one embodiment, at ANALYZE THE TRANSACTIONAL DATA ASSOCIATED WITH THE BUSINESS USING THE VENDOR REPORTING REQUIREMENT DATA TO IDENTIFY SUBJECT VENDORS OF THE BUSINESS OPERATION 211 the financial transaction data associated with the business is analyzed by one or more processors associated with one or more computing systems to identify all vendors with whom the business has spent $600.00 or more in the past tax year because, under the Act, a 1099 form must be submitted to each of these identified subject vendors.

In one embodiment, once the financial transaction data associated with the business of OBTAIN FINANCIAL TRANSACTION DATA ASSOCIATED WITH A BUSINESS OPERATION 209 is analyzed using at least part of the current vendor reporting requirement data of OBTAIN VENDOR REPORTING REQUIREMENT DATA OPERATION 205 to identify/match one or more vendors used by the business that are subject to the reporting requirement and therefore require the preparation and submission of one or more of one or more forms of OBTAIN VENDOR REPORTING FORM DATA OPERATION 207 associated with the reporting requirement at ANALYZE THE TRANSACTIONAL DATA ASSOCIATED WITH THE BUSINESS USING THE VENDOR REPORTING REQUIREMENT DATA TO IDENTIFY SUBJECT VENDORS OF THE BUSINESS OPERATION 211, process flow proceeds to IDENTIFY ONE OR MORE SUBJECT VENDORS OF THE BUSINESS FOR WHICH A FORM MUST BE FILLED OUT AND SUBMITTED OPERATION 213.

In one embodiment, at IDENTIFY ONE OR MORE SUBJECT VENDORS OF THE BUSINESS FOR WHICH A FORM MUST BE FILLED OUT AND SUBMITTED OPERATION 213, based on the analysis of at ANALYZE THE TRANSACTIONAL DATA ASSOCIATED WITH THE BUSINESS USING THE VENDOR REPORTING REQUIREMENT DATA TO IDENTIFY SUBJECT VENDORS OF THE BUSINESS OPERATION 211, one or more subject vendors used by the business that are subject to the reporting requirement of OBTAIN VENDOR REPORTING REQUIREMENT DATA OPERATION 205 and therefore require the preparation and submission of one or more of one or more forms of OBTAIN VENDOR REPORTING FORM DATA OPERATION 207 associated with the reporting requirement are identified/matched.

As a specific example, in the case of the 1099 reporting requirement of the Health Care and Education Reconciliation Act of 2010 (Pub.L. 111-152, 124 Stat. 1029), in one embodiment, at IDENTIFY ONE OR MORE SUBJECT VENDORS OF THE BUSINESS FOR WHICH A FORM MUST BE FILLED OUT AND SUBMITTED OPERATION 213, based on the analysis of at ANALYZE THE TRANSACTIONAL DATA ASSOCIATED WITH THE BUSINESS USING THE VENDOR REPORTING REQUIREMENT DATA TO IDENTIFY SUBJECT VENDORS OF THE BUSINESS OPERATION 211, one or more vendors used by the business and with whom the business has spent more than $600.00 in the past tax year, and therefore require a form 1099, are identified/matched as subject vendors.

In one embodiment, once based on the analysis of at ANALYZE THE TRANSACTIONAL DATA ASSOCIATED WITH THE BUSINESS USING THE VENDOR REPORTING REQUIREMENT DATA TO IDENTIFY SUBJECT VENDORS OF THE BUSINESS OPERATION 211, one or more subject vendors used by the business that are subject to the reporting requirement of OBTAIN VENDOR REPORTING REQUIREMENT DATA OPERATION 205 and therefore require the preparation and submission of one or more of one or more forms of OBTAIN VENDOR REPORTING FORM DATA OPERATION 207 associated with the reporting requirement are identified/matched IDENTIFY ONE OR MORE SUBJECT VENDORS OF THE BUSINESS FOR WHICH A FORM MUST BE FILLED OUT AND SUBMITTED OPERATION 213, process flow proceeds to USE THE FINANCIAL TRANSACTION DATA ASSOCIATED WITH THE BUSINESS AND THE VENDOR IDENTIFICATION DATA TO AUTOMATICALLY FILL OUT THE REQUIRED FORM FOR EACH OF THE IDENTIFIED SUBJECT VENDORS OF THE BUSINESS OPERATION 215.

In one embodiment, at USE THE FINANCIAL TRANSACTION DATA ASSOCIATED WITH THE BUSINESS AND THE VENDOR IDENTIFICATION DATA TO AUTOMATICALLY FILL OUT THE REQUIRED FORM FOR EACH OF THE IDENTIFIED SUBJECT VENDORS OF THE BUSINESS OPERATION 215 at least part of the identification data associated with subject vendors of CREATE/GAIN ACCESS TO A VENDOR IDENTIFICATION DATABASE OPERATION 203, and at least part of the financial transaction data associated with the business OBTAIN FINANCIAL TRANSACTION DATA ASSOCIATED WITH A BUSINESS OPERATION 209, is used to auto-fill at least part of the one or more forms of OBTAIN VENDOR REPORTING FORM DATA OPERATION 207 associated with the reporting requirement of OBTAIN VENDOR REPORTING REQUIREMENT DATA OPERATION 205 for each of the identified subject vendors of IDENTIFY ONE OR MORE SUBJECT VENDORS OF THE BUSINESS FOR WHICH A FORM MUST BE FILLED OUT AND SUBMITTED OPERATION 213.

In one embodiment, at USE THE FINANCIAL TRANSACTION DATA ASSOCIATED WITH THE BUSINESS AND THE VENDOR IDENTIFICATION DATA TO AUTOMATICALLY FILL OUT THE REQUIRED FORM FOR EACH OF THE IDENTIFIED SUBJECT VENDORS OF THE BUSINESS OPERATION 215: financial transaction data associated with the business that is related to the identified subject vendors, such as the actual amount spent with the subject vendors, dates of the transactions, and/or items purchased; identification data associated with the subject vendors, such as the subject vendor's EIN/SSN or tax ID number; contact data associated with the subject vendors; contact data associated with any required reporting agency; and data representing the one or more required forms, is automatically gathered and correlated to the respective identified subject vendors by one or more processors, such as CPU 101, CPU 151, and/or processor 121 of FIG. 1, associated with one or more computing systems, such as business computing system 100, vendor computing system 150 and/or provider computing system 120 of FIG. 1.

In one embodiment, at USE THE FINANCIAL TRANSACTION DATA ASSOCIATED WITH THE BUSINESS AND THE VENDOR IDENTIFICATION DATA TO AUTOMATICALLY FILL OUT THE REQUIRED FORM FOR EACH OF THE IDENTIFIED SUBJECT VENDORS OF THE BUSINESS OPERATION 215 a listing of the one or more identified subject vendors and/or any of the data associated with the identified subject vendors is presented to the business owner for review and/or approval, in one embodiment, on a business computing system, such as business computing system 100 of FIG. 1.

Returning to FIG. 2, as a specific example, in the case of the 1099 reporting requirement of the Health Care and Education Reconciliation Act of 2010 (Pub.L. 111-152, 124 Stat. 1029) at USE THE FINANCIAL TRANSACTION DATA ASSOCIATED WITH THE BUSINESS AND THE VENDOR IDENTIFICATION DATA TO AUTOMATICALLY FILL OUT THE REQUIRED FORM FOR EACH OF THE IDENTIFIED SUBJECT VENDORS OF THE BUSINESS OPERATION 215: financial transaction data associated with the business that is related to the identified subject vendors with whom the business spent $600.00 or more in the previous tax year, such as the actual amount spent with the subject vendors, dates of the transactions, and/or items purchased; identification data associated with the subject vendors with whom the business spent $600.00 or more in the previous tax year, such as the subject vendor's EIN/SSN or tax ID number; contact data associated with the subject vendors with whom the business spent $600.00 or more in the previous tax year; and data representing and IRS 1099 form, is automatically gathered and correlated to the respective identified subject vendors with whom the business spent $600.00 or more in the previous tax year using one or more processors associated with one or more computing systems.

In one embodiment, at USE THE FINANCIAL TRANSACTION DATA ASSOCIATED WITH THE BUSINESS AND THE VENDOR IDENTIFICATION DATA TO AUTOMATICALLY FILL OUT THE REQUIRED FORM FOR EACH OF THE IDENTIFIED SUBJECT VENDORS OF THE BUSINESS OPERATION 215: the financial transaction data associated with the business that is related to the identified subject vendors, such as the actual amount spent with the subject vendors, dates of the transactions, and/or items purchased; the identification data associated with the subject vendors, such as the subject vendor's EIN/SSN or tax ID number; the contact data associated with the subject vendors; and the contact data associated with any required reporting agency is used by one or more processors, such as CPU 101, CPU 151, and/or processor 121 of FIG. 1, associated with one or more computing systems, such as business computing system 100, vendor computing system 150 and/or provider computing system 120 of FIG. 1 to automatically fill out, i.e., "auto-fill" the one or more required forms for each identified subject vendor; thereby transforming the one or more required forms into filled out, or completed, or partially completed, forms.

In one embodiment, at USE THE FINANCIAL TRANSACTION DATA ASSOCIATED WITH THE BUSINESS AND THE VENDOR IDENTIFICATION DATA TO AUTOMATICALLY FILL OUT THE REQUIRED FORM FOR EACH OF THE IDENTIFIED SUBJECT VENDORS OF THE BUSINESS OPERATION 215 the auto-filled one or more required forms for each identified subject vendor are presented to the business owner for review and/or approval, in one embodiment, on a business computing system, such as business computing system 100 of FIG. 1.

Returning to FIG. 2, as a specific example, in the case of the 1099 reporting requirement of the Health Care and Education Reconciliation Act of 2010 (Pub.L. 111-152, 124 Stat. 1029), at USE THE FINANCIAL TRANSACTION DATA ASSOCIATED WITH THE BUSINESS AND THE VENDOR IDENTIFICATION DATA TO AUTOMATICALLY FILL OUT THE REQUIRED FORM FOR EACH OF THE IDENTIFIED SUBJECT VENDORS OF THE BUSINESS OPERATION 215: the financial transaction data associated with the business that is related to the identified subject vendors with whom the business spent $600.00 or more in the previous tax year; the identification data associated with the subject vendors with whom the business spent $600.00 or more in the previous tax year; and the contact data associated with the subject vendors with whom the business spent $600.00 or more in the previous tax year is used to auto-fill a 1099 for each identified subject vendor with whom the business spent $600.00 or more in the previous tax year.

In one embodiment, once at least part of the identification data associated with subject vendors of CREATE/GAIN ACCESS TO A VENDOR IDENTIFICATION DATABASE OPERATION 203, and at least part of the financial transaction data associated with the business OBTAIN FINANCIAL TRANSACTION DATA ASSOCIATED WITH A BUSINESS OPERATION 209, is used to auto-fill at least part of the one or more forms of OBTAIN VENDOR REPORTING FORM DATA OPERATION 207 associated with the reporting requirement of OBTAIN VENDOR REPORTING REQUIREMENT DATA OPERATION 205 for each of the identified subject vendors of IDENTIFY ONE OR MORE SUBJECT VENDORS OF THE BUSINESS FOR WHICH A FORM MUST BE FILLED OUT AND SUBMITTED OPERATION 213 at USE THE FINANCIAL TRANSACTION DATA ASSOCIATED WITH THE BUSINESS AND THE VENDOR IDENTIFICATION DATA TO AUTOMATICALLY FILL OUT THE REQUIRED FORM FOR EACH OF THE IDENTIFIED SUBJECT VENDORS OF THE BUSINESS OPERATION 215, process flow proceeds to AUTOMATICALLY SUBMIT THE REQUIRED FORM FOR EACH OF THE IDENTIFIED SUBJECT VENDORS OF THE BUSINESS TO THE RESPECTIVE VENDOR AND/OR PROPER AUTHORITY OPERATION 217.

In one embodiment, at AUTOMATICALLY SUBMIT THE REQUIRED FORM FOR EACH OF THE IDENTIFIED SUBJECT VENDORS OF THE BUSINESS TO THE RESPECTIVE VENDOR AND/OR PROPER AUTHORITY OPERATION 217 the auto-filled forms associated with the reporting requirement for each of the identified subject vendors of USE THE FINANCIAL TRANSACTION DATA ASSOCIATED WITH THE BUSINESS AND THE VENDOR IDENTIFICATION DATA TO AUTOMATICALLY FILL OUT THE REQUIRED FORM FOR EACH OF THE IDENTIFIED SUBJECT VENDORS OF THE BUSINESS OPERATION 215 are sent to the respective vendors, and/or the appropriate reporting agency, using the identification data associated with subject vendors of CREATE/GAIN ACCESS TO A VENDOR IDENTIFICATION DATABASE OPERATION 203 and the data representing current vendor reporting requirements of OBTAIN VENDOR REPORTING REQUIREMENT DATA OPERATION 205.

In one embodiment, at AUTOMATICALLY SUBMIT THE REQUIRED FORM FOR EACH OF THE IDENTIFIED SUBJECT VENDORS OF THE BUSINESS TO THE RESPECTIVE VENDOR AND/OR PROPER AUTHORITY OPERATION 217 the auto-filled forms associated with the reporting requirement for each of the identified subject vendors are automatically, or semi-automatically, sent to the respective vendors, and/or the appropriate reporting agency, using the identification data associated with subject vendors and the data representing current vendor reporting requirements by one or more processors, such as CPU 101, CPU 151, and/or processor 121 of FIG. 1, associated with one or more computing systems, such as business computing system 100, vendor computing system 150 and/or provider computing system 120 of FIG. 1.

In one embodiment, at AUTOMATICALLY SUBMIT THE REQUIRED FORM FOR EACH OF THE IDENTIFIED SUBJECT VENDORS OF THE BUSINESS TO THE RESPECTIVE VENDOR AND/OR PROPER AUTHORITY OPERATION 217 the auto-filled forms associated with the reporting requirement for each of the identified subject vendors are semi-automatically sent to the respective vendors subject to the review and/or approval of the auto-filled forms by the business owner.

In one embodiment, at AUTOMATICALLY SUBMIT THE REQUIRED FORM FOR EACH OF THE IDENTIFIED SUBJECT VENDORS OF THE BUSINESS TO THE RESPECTIVE VENDOR AND/OR PROPER AUTHORITY OPERATION 217 the auto-filled forms associated with the reporting requirement for each of the identified subject vendors are automatically sent to the respective vendors without review and/or approval of the auto-filled forms by the business owner.

As a specific example, in the case of the 1099 reporting requirement of the Health Care and Education Reconciliation Act of 2010 (Pub.L. 111-152, 124 Stat. 1029), at AUTOMATICALLY SUBMIT THE REQUIRED FORM FOR EACH OF THE IDENTIFIED SUBJECT VENDORS OF THE BUSINESS TO THE RESPECTIVE VENDOR AND/OR PROPER AUTHORITY OPERATION 217, the auto-filled 1099 forms for each of the identified subject vendors with whom the business spent $600.00 or more in the previous tax year are automatically, or semi-automatically, sent to the respective vendors.

In one embodiment, once the auto-filled forms associated with the reporting requirement for each of the identified subject vendors of USE THE FINANCIAL TRANSACTION DATA ASSOCIATED WITH THE BUSINESS AND THE VENDOR IDENTIFICATION DATA TO AUTOMATICALLY FILL OUT THE REQUIRED FORM FOR EACH OF THE IDENTIFIED SUBJECT VENDORS OF THE BUSINESS OPERATION 215 are sent to the respective vendors, and/or the appropriate reporting agency, using the identification data associated with subject vendors of CREATE/GAIN ACCESS TO A VENDOR IDENTIFICATION DATABASE OPERATION 203 and the data representing current vendor reporting requirements of OBTAIN VENDOR REPORTING REQUIREMENT DATA OPERATION 205 at AUTOMATICALLY SUBMIT THE REQUIRED FORM FOR EACH OF THE IDENTIFIED SUBJECT VENDORS OF THE BUSINESS TO THE RESPECTIVE VENDOR AND/OR PROPER AUTHORITY OPERATION 217, process flow proceeds to AUTOMATICALLY GENERATE AND SAVE A COPY OF THE SUBMITTED REQUIRED FORMS FOR THE EACH OF THE IDENTIFIED SUBJECT VENDORS OPERATION 219.

In one embodiment, at AUTOMATICALLY GENERATE AND SAVE A COPY OF THE SUBMITTED REQUIRED FORMS FOR THE EACH OF THE IDENTIFIED SUBJECT VENDORS OPERATION 219 one or more copies of the submitted forms of AUTOMATICALLY SUBMIT THE REQUIRED FORM FOR EACH OF THE IDENTIFIED SUBJECT VENDORS OF THE BUSINESS TO THE RESPECTIVE VENDOR AND/OR PROPER AUTHORITY OPERATION 217 are retained in one or more locations for access by the business owner.

In one embodiment, at AUTOMATICALLY GENERATE AND SAVE A COPY OF THE SUBMITTED REQUIRED FORMS FOR THE EACH OF THE IDENTIFIED SUBJECT VENDORS OPERATION 219 a copy of the submitted forms is automatically retained for access by the business owner in electronic format via one or more processors, such as CPU 101, CPU 151, and/or processor 121 of FIG. 1, associated with one or more computing systems, such as business computing system 100, vendor computing system 150 and/or provider computing system 120 of FIG. 1.

Returning to FIG. 2, in one embodiment, at AUTOMATICALLY GENERATE AND SAVE A COPY OF THE SUBMITTED REQUIRED FORMS FOR THE EACH OF THE IDENTIFIED SUBJECT VENDORS OPERATION 219 a copy of the submitted forms is automatically retained for access by the business owner in electronic format in a database, such as database 170 of FIG. 1.

Returning to FIG. 2, in one embodiment, at AUTOMATICALLY GENERATE AND SAVE A COPY OF THE SUBMITTED REQUIRED FORMS FOR THE EACH OF THE IDENTIFIED SUBJECT VENDORS OPERATION 219 a copy of the submitted forms is automatically retained for access by the business owner in electronic format and is stored in a memory system, or database, or in a cache memory, or in any main memory or mass memory, associated with any computing system as discussed herein, and/or as known in the art at the time of filing, and/or as developed after the time of filing.

In one embodiment, at AUTOMATICALLY GENERATE AND SAVE A COPY OF THE SUBMITTED REQUIRED FORMS FOR THE EACH OF THE IDENTIFIED SUBJECT VENDORS OPERATION 219 a copy of the submitted forms is automatically retained for access by the business owner in electronic format and, in whole, or in part, is stored in any computing system, such as business computing system 100 and/or vendor computing system 150 of FIG. 1, and/or server system, such as provider computing system 120 of FIG. 1, and/or a database, such as database 170 of FIG. 1, or any other device, in another location, or on/in a computer readable medium, and/or any other computer program product, as defined herein.

Returning to FIG. 1, in one embodiment, at AUTOMATICALLY GENERATE AND SAVE A COPY OF THE SUBMITTED REQUIRED FORMS FOR THE EACH OF THE IDENTIFIED SUBJECT VENDORS OPERATION 219 a copy of the submitted forms is automatically retained for access by the business owner in electronic format and, in whole, or in part, is stored on a webpage, in a web-based system or on a public network such as the Internet.

In one embodiment, at AUTOMATICALLY GENERATE AND SAVE A COPY OF THE SUBMITTED REQUIRED FORMS FOR THE EACH OF THE IDENTIFIED SUBJECT VENDORS OPERATION 219 a copy of the submitted forms is automatically retained for access by the business owner in electronic format on a web-page, or via a web-based function, under the control of, and/or accessible by, the business owner, and/or a provider of process for determining business expenditures with vendors and automatically generating and submitting required forms 200, and/or a third party.

In one embodiment, once one or more copies of the submitted forms of AUTOMATICALLY SUBMIT THE REQUIRED FORM FOR EACH OF THE IDENTIFIED SUBJECT VENDORS OF THE BUSINESS TO THE RESPECTIVE VENDOR AND/OR PROPER AUTHORITY OPERATION 217 are retained in one or more locations for access by the business owner at AUTOMATICALLY GENERATE AND SAVE A COPY OF THE SUBMITTED REQUIRED FORMS FOR THE EACH OF THE IDENTIFIED SUBJECT VENDORS OPERATION 219, process flow proceeds to EXIT OPERATION 231.

In one embodiment at EXIT OPERATION 231 process for determining business expenditures with vendors and automatically generating and submitting required forms 200 is exited to await new data.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

Using process for determining business expenditures with vendors and automatically generating and submitting required forms 200, the expenditures made by a business with its vendors is tracked automatically by analyzing already existing financial transaction data associated with the business and vendors subject to a reporting requirement are automatically identified and correlated with their vendor identification data, and any reporting agency contact data. Then, using process for determining business expenditures with vendors and automatically generating and submitting required forms 200, the already existing financial transaction data associated with the business, and the vendor identification data and any reporting agency contact data, is used to automatically, or semi-automatically, fill out the required forms, submit them to the subject vendors and/or reporting agencies, and a copy of the submitted forms is automatically saved for further use/evidence.

Consequently, using process for determining business expenditures with vendors and automatically generating and submitting required forms 200, the business owner is spared the considerable burden and use of resources currently required for: tracking expenditures with all vendors; identifying subject vendors with which the business spends some threshold amount, or more; obtaining the proper identification and contact information for each subject vendor, such as the subject vendor's EIN/SSN number; gathering the expenditure data associated with all the subject vendors; obtaining the appropriate one or more forms required; using the expenditure data to fill out one or more required forms, for each subject vendor; submitting the required forms to the each subject vendor and/or the proper agency; and then creating and retaining proof of these actions for each subject vendor.

As a result, using process for determining business expenditures with vendors and automatically generating and submitting required forms 200, a business owner can devote these saved resources to creating a more efficient and profitable business, thereby benefitting both the business and the economy as a whole.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "designating", "indemnifying", "correlating", "monitoring", "matching", "updating", "associating", "analyzing", "defining", "storing", "saving", "displaying", "categorizing", "providing", "processing", "accessing", "selecting", "creating", "using", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG. s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for analyzing business expenditures with vendors and automatically generating and submitting required forms comprising:
　one or more computing processors; and
　one or more memories coupled to the one or more computing processors, the one or more memories having stored therein instructions which when executed by the one or more computing processors, perform a method comprising:
　obtaining data correlating one or more vendors to their identification data and storing the vendors' identification data in a vendor identification database;
　obtaining reporting requirement data from a first entity, the first entity imposing a reporting requirement for a first time period, the reporting requirement imposing a reporting requirement on a first business regarding vendors of the first business, the first entity further being different from the vendor and different from a first business, the first business being a customer of the vendor;
　obtaining financial transaction data associated with at least one transaction that previously took place between the first business and the vendor over the first time period;
　analyzing the at least one financial transaction and the reporting requirement data to identify one more subject vendors that meet the reporting requirement;
　obtaining, from the first entity, data representing electronic copies of one or more reporting forms associated with the first entity reporting requirement;
　auto-filling, on behalf of the first business, one or more electronic copies of at least one reporting form of the one or more reporting forms associated with the reporting requirement, the auto-filling being accomplished using at least part of the vendors' identification data for the subject vendors and at least part of the financial transaction data associated with the first business, resulting in filled-in reporting forms associated with the reporting requirement;

submitting, by the first business, the filled-in reporting forms associated with the reporting requirement to parties required by the reporting requirement; and storing data representing one or more copies of the submitted filled-in reporting forms associated with the reporting requirement.

2. A system for analyzing business expenditures with vendors and automatically generating and submitting required forms of claim 1, wherein;

at least part of the vendors' identification data stored in the vendor identification database is selected from the group of vendors' identification data consisting of:

the vendor's Employer Identification Number (EIN);

the vendor's Social Security Number (SSN);

the vendor's tax ID number;

e-mail addresses associated with the vendors;

websites/postings and/or links thereto associated with the vendors;

phone numbers associated with the vendors;

physical addresses associated with the vendors; and log-on data for various sites/systems associated with the vendors.

3. A system for analyzing business expenditures with vendors and automatically generating and submitting required forms of claim 1, wherein;

at least part of the reporting requirement data is selected from the group of the reporting requirement data consisting of:

data indicating threshold parameters that define subject vendors subject to the reporting requirement;

data indicating forms used in connection with the reporting requirement;

data indicating parties who must receive the filled-in forms used in connection with the reporting requirement; and contact information for agencies or other parties that must receive the filled-in forms used in connection with the reporting requirement.

4. A system for analyzing business expenditures with vendors and automatically generating and submitting required forms of claim 1, wherein;

at least part of the financial transaction data associated with the first business is selected from the group of financial transaction data consisting of:

payee/vendor identification;

payee/vendor location;

payment amount;

date of the transaction; and the type of transaction.

5. A system for analyzing business expenditures with vendors and automatically generating and submitting required forms of claim 1, wherein;

the financial transaction data is obtained from a data management system of the first business.

6. A system for analyzing business expenditures with vendors and automatically generating and submitting required forms of claim 1, wherein;

the financial transaction data associated with the first business is obtained from a financial management system used by the first business.

7. A system for analyzing business expenditures with vendors and automatically generating and submitting required forms of claim 1, wherein;

the financial transaction data associated with one or more vendors is obtained by an on-line financial management system used by the first business.

8. A system for analyzing business expenditures with vendors and automatically generating and submitting required forms comprising:

a provider computing system;

a first business computing system;

a data management system implemented, at least in part, on the first business computing system; and one or more computing processors associated with the one or more computing systems, the one or more computing processors implementing:

obtaining data correlating one or more vendors to their identification data and storing the vendors' identification data in a vendor identification database;

obtaining reporting requirement data from a first entity, the first entity imposing a reporting requirement for a first time period, the reporting requirement imposing a reporting requirement on a first business regarding vendors of the first business, the first entity further being different from the vendor and different from a first business, a first business being a customer of the vendor;

obtaining, from the data management system, financial transaction data associated with at least one transaction that previously took place between the first business and the vendor over the first time period;

analyzing the at least one financial transaction and the reporting requirement data to identify one more subject vendors that meet the reporting requirement;

obtaining, from the first entity, data representing electronic copies of one of more vendor reporting forms associated with the first entity reporting requirement;

auto-filling, on behalf of the first business, one or more electronic copies of at least one vendor reporting form of the one or more reporting forms associated with the vendor reporting requirement, the auto-filling being accomplished using at least part of the vendors' identification data for the subject vendors and at least part of the financial transaction data associated with the first business, resulting in filled-in reporting forms associated with the reporting requirement;

submitting, by the first business, the filled-in vendor reporting forms associated with the vendor reporting requirement to parties required by the reporting requirement; and storing data representing one or more copies of the submitted filled-in reporting forms associated with the vendor reporting requirement.

9. The system for analyzing business expenditures with vendors and automatically generating and submitting required forms of claim 8, wherein;

at least part of the vendors' identification data stored in the vendor identification database is selected from the group of vendors' identification data consisting of:

the vendor's Employer Identification Number (EIN);

the vendor's Social Security Number (SSN);

the vendor's tax ID number;

e-mail addresses associated with the vendors;

websites/postings and/or links thereto associated with the vendors;

phone numbers associated with the vendors;

physical addresses associated with the vendors; and log-on data for various sites/systems associated with the vendors.

10. The system for analyzing business expenditures with vendors and automatically generating and submitting required forms of claim 8, wherein;
at least part of the reporting requirement data is selected from the group of the reporting requirement data consisting of:
data indicating threshold parameters that define subject vendors subject to the reporting requirement;
data indicating forms used in connection with the reporting requirement;
data indicating parties who must receive the filled-in forms used in connection with the reporting requirement; and
contact information for agencies or other parties that must receive the filled-in forms used in connection with the reporting requirement.

11. The system for analyzing business expenditures with vendors and automatically generating and submitting required forms of claim 8, wherein;
at least part of the financial transaction data associated with the first business is selected from the group of financial transaction data consisting of:
payee/vendor identification;
payee/vendor location;
payment amount;
date of the transaction; and
the type of transaction.

12. The system for analyzing business expenditures with vendors and automatically generating and submitting required forms of claim 8, wherein;
the data management system is a financial management system of the first business.

* * * * *